(12) United States Patent
Proudler

(10) Patent No.: US 7,877,799 B2
(45) Date of Patent: Jan. 25, 2011

(54) PERFORMANCE OF A SERVICE ON A COMPUTING PLATFORM

(75) Inventor: Graeme John Proudler, Gifford (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2859 days.

(21) Appl. No.: 09/920,554

(22) Filed: Aug. 1, 2001

(65) Prior Publication Data

US 2002/0023212 A1    Feb. 21, 2002

(30) Foreign Application Priority Data

Aug. 18, 2000    (GB) ................................ 0020441.2

(51) Int. Cl.
G06F 12/14    (2006.01)
G06F 11/30    (2006.01)
H04L 9/00    (2006.01)
H04L 29/06    (2006.01)

(52) U.S. Cl. .................... 726/21; 713/166; 713/187; 713/193; 713/194

(58) Field of Classification Search ......... 713/164–167, 713/176, 187, 193, 194; 709/223–226, 229; 726/21

See application file for complete search history.

(56) References Cited

U.S. PATENT DOCUMENTS

| | | | |
|---|---|---|---|
| 4,799,156 A | 1/1989 | Shavit et al. .................. 705/26 |
| 4,926,476 A | 5/1990 | Covey ........................ 713/164 |
| 5,029,206 A | 7/1991 | Marino et al. ............... 713/164 |
| 5,032,979 A | 7/1991 | Hecht et al. ................. 364/200 |
| 5,038,281 A | 8/1991 | Peters ........................ 364/200 |
| 5,144,660 A | 9/1992 | Rose ............................. 380/4 |
| 5,359,659 A | 10/1994 | Rosenthal ..................... 380/4 |
| 5,361,359 A | 11/1994 | Tajalli et al. ................. 395/700 |
| 5,404,532 A | 4/1995 | Allen et al. .................. 395/700 |
| 5,421,006 A | 5/1995 | Jablon et al. ................. 395/575 |
| 5,440,723 A | 8/1995 | Arnold et al. ................ 395/181 |
| 5,444,850 A | 8/1995 | Chang ..................... 395/200.1 |

(Continued)

FOREIGN PATENT DOCUMENTS

CA    2 187 855    6/1997

(Continued)

OTHER PUBLICATIONS

"HP Virtualvault Trusted Web-server Platform Product Brief". Hewlett-Packard Company, Jan. 1999. pp. 1-6.*

(Continued)

*Primary Examiner*—Zachary A Davis

(57) ABSTRACT

A method of performing a service for a requestor on a computing platform includes the requestor providing to the computing platform a specification of the service to be performed, which establishes specified levels of trust for at least some of the processes in the service. The computing platform executes the service according to the specification and logs performance of at least some of the processes for which a level of trust was specified. The computing platform then provides the requestor with a log of the performance of the processes performed according to the specified levels of trust. A computing platform for carrying out services includes a physically and logically protected computing environment for providing trustworthy data to appropriate users of the computing platform. The platform further includes one or more compartments arranged to operate in a sufficiently constrained manner such that processes executed in a compartment are performed reliably.

30 Claims, 8 Drawing Sheets

U.S. PATENT DOCUMENTS

| | | | | |
|---|---|---|---|---|
| 5,473,692 | A | 12/1995 | Davis | 380/25 |
| 5,504,814 | A | 4/1996 | Miyahara | 713/164 |
| 5,530,758 | A | 6/1996 | Marino et al. | 713/150 |
| 5,572,590 | A | 11/1996 | Chess | 380/4 |
| 5,619,571 | A | 4/1997 | Sandstrom et al. | 380/4 |
| 5,680,547 | A | 10/1997 | Chang | 395/200.01 |
| 5,692,124 | A | 11/1997 | Holden et al. | 726/2 |
| 5,694,590 | A | 12/1997 | Thuraisingham et al. | 395/600 |
| 5,771,354 | A | 6/1998 | Crawford | 709/229 |
| 5,781,703 | A | 7/1998 | Desai et al. | |
| 5,787,175 | A | 7/1998 | Carter | 713/165 |
| 5,809,145 | A | 9/1998 | Slik et al. | 380/25 |
| 5,815,665 | A | 9/1998 | Teper et al. | 395/200.59 |
| 5,841,869 | A * | 11/1998 | Merkling et al. | 713/164 |
| 5,844,986 | A | 12/1998 | Davis | 380/4 |
| 5,845,068 | A | 12/1998 | Winiger | 726/3 |
| 5,867,646 | A | 2/1999 | Benson et al. | 395/186 |
| 5,889,989 | A | 3/1999 | Robertazzi et al. | 718/105 |
| 5,892,900 | A | 4/1999 | Ginter et al. | 726/26 |
| 5,903,732 | A | 5/1999 | Reed et al. | 395/200.59 |
| 5,922,074 | A * | 7/1999 | Richard et al. | 726/21 |
| 5,933,498 | A | 8/1999 | Schneck et al. | 380/4 |
| 5,960,177 | A | 9/1999 | Tanno | 395/200.59 |
| 5,987,608 | A | 11/1999 | Roskind | 713/200 |
| 6,006,332 | A | 12/1999 | Rabne et al. | 713/201 |
| 6,012,080 | A | 1/2000 | Ozden et al. | 718/102 |
| 6,023,765 | A | 2/2000 | Kuhn | 713/200 |
| 6,058,426 | A | 5/2000 | Godwin et al. | |
| 6,067,559 | A | 5/2000 | Allard et al. | 709/202 |
| 6,078,948 | A | 6/2000 | Podgorny et al. | 709/204 |
| 6,081,830 | A | 6/2000 | Schindler | 709/204 |
| 6,081,894 | A | 6/2000 | Mann | 713/188 |
| 6,125,114 | A | 9/2000 | Blanc et al. | 370/389 |
| 6,138,239 | A | 10/2000 | Veil | 713/200 |
| 6,154,838 | A | 11/2000 | Le et al. | 713/2 |
| 6,157,719 | A | 12/2000 | Wasilewski et al. | 380/210 |
| 6,185,678 | B1 | 2/2001 | Arbaugh et al. | 713/2 |
| 6,272,631 | B1 | 8/2001 | Thomlinson et al. | 713/155 |
| 6,275,848 | B1 | 8/2001 | Arnold | 709/206 |
| 6,289,462 | B1 * | 9/2001 | McNabb et al. | 713/201 |
| 6,292,900 | B1 | 9/2001 | Ngo et al. | 713/200 |
| 6,327,579 | B1 | 12/2001 | Crawford | 705/400 |
| 6,327,652 | B1 * | 12/2001 | England et al. | 713/2 |
| 6,330,670 | B1 | 12/2001 | England et al. | 713/2 |
| 6,334,118 | B1 | 12/2001 | Benson | 713/167 |
| 6,367,012 | B1 | 4/2002 | Atkinson et al. | 713/176 |
| 6,393,412 | B1 | 5/2002 | Deep | 705/400 |
| 6,477,702 | B1 | 11/2002 | Yellin et al. | 717/126 |
| 6,505,300 | B2 * | 1/2003 | Chan et al. | 713/164 |
| 6,513,156 | B2 | 1/2003 | Bak et al. | 717/151 |
| 6,609,248 | B1 | 8/2003 | Srivastava et al. | 717/147 |
| 6,622,018 | B1 | 9/2003 | Erekson | 455/420 |
| 6,671,716 | B1 | 12/2003 | Diedrichsen et al. | 709/203 |
| 6,681,304 | B1 | 1/2004 | Vogt et al. | 711/164 |
| 6,701,440 | B1 | 3/2004 | Kim et al. | 726/24 |
| 6,732,276 | B1 | 5/2004 | Cofler et al. | 713/200 |
| 6,751,680 | B2 | 6/2004 | Langerman et al. | 710/3 |
| 6,757,824 | B1 | 6/2004 | England | 713/156 |
| 6,757,830 | B1 | 6/2004 | Tarbotton et al. | 713/188 |
| 6,775,779 | B1 | 8/2004 | England et al. | 713/200 |
| 6,892,307 | B1 * | 5/2005 | Wood et al. | 726/8 |
| 6,931,545 | B1 | 8/2005 | Ta et al. | 713/156 |
| 6,948,069 | B1 | 9/2005 | Teppler | 713/178 |
| 6,965,816 | B2 | 11/2005 | Walker | 701/16 |
| 6,988,250 | B1 | 1/2006 | Proudler et al. | 716/1 |
| 7,194,623 | B1 | 3/2007 | Proudler et al. | |
| 2001/0037450 | A1 | 11/2001 | Metlitski et al. | 713/152 |
| 2002/0012432 | A1 | 1/2002 | England et al. | 380/231 |
| 2002/0023212 | A1 | 2/2002 | Proudler | 713/164 |
| 2002/0042874 | A1 | 4/2002 | Arora | 712/229 |
| 2002/0069354 | A1 | 6/2002 | Fallon et al. | 713/2 |
| 2002/0120575 | A1 | 8/2002 | Pearson et al. | 705/51 |
| 2002/0184486 | A1 | 12/2002 | Kershenbaum et al. | 713/150 |
| 2002/0184520 | A1 | 12/2002 | Bush et al. | 713/200 |
| 2003/0191957 | A1 | 10/2003 | Hypponen et al. | 713/200 |
| 2003/0196083 | A1 | 10/2003 | Grawrock et al. | 713/156 |
| 2003/0196110 | A1 | 10/2003 | Lampson et al. | 713/200 |
| 2004/0045019 | A1 | 3/2004 | Bracha et al. | 719/332 |
| 2004/0073617 | A1 | 4/2004 | Milliken et al. | 709/206 |
| 2004/0148514 | A1 | 7/2004 | Fee et al. | 713/200 |
| 2005/0256799 | A1 | 11/2005 | Warsaw et al. | 705/37 |

FOREIGN PATENT DOCUMENTS

| | | |
|---|---|---|
| EP | 0 304 033 A2 | 2/1989 |
| EP | 325777 A2 | 8/1989 |
| EP | 0 421 409 A2 | 4/1991 |
| EP | 0 510 244 A1 | 10/1992 |
| EP | 0 580 350 A1 | 1/1994 |
| EP | 0 825 511 A2 | 2/1998 |
| EP | 825511 A2 * | 2/1998 |
| EP | 0 849 657 A1 | 6/1998 |
| EP | 0 849 680 A2 | 6/1998 |
| EP | 0 465 016 | 12/1998 |
| EP | 0 893 751 A1 | 1/1999 |
| EP | 0 895 148 A1 | 2/1999 |
| EP | 0 926 605 A1 | 6/1999 |
| EP | 0 992 958 A2 | 4/2000 |
| EP | 1 030 237 A1 | 8/2000 |
| EP | 1 056 014 A1 | 8/2000 |
| EP | 1 049 036 A2 | 11/2000 |
| EP | 1 055 990 A1 | 11/2000 |
| EP | 1 056 010 A1 | 11/2000 |
| EP | 1 076 279 A1 | 2/2001 |
| EP | 1 107 137 A2 | 6/2001 |
| GB | 2 317 476 A | 3/1998 |
| GB | 2 336 918 A | 11/1999 |
| GB | 0020441.2 | 8/2000 |
| GB | 2 353 885 A1 | 3/2001 |
| GB | 2 361 153 A | 10/2001 |
| WO | 93/25024 | 12/1993 |
| WO | 94/11967 A1 | 5/1994 |
| WO | 95/24696 | 9/1995 |
| WO | 95/27249 | 10/1995 |
| WO | 97/29416 A2 | 8/1997 |
| WO | 98/15082 | 4/1998 |
| WO | 98/26529 | 6/1998 |
| WO | 98/36517 | 8/1998 |
| WO | 98/40809 A2 | 9/1998 |
| WO | 98/44402 | 10/1998 |
| WO | 98/45778 | 10/1998 |
| WO | 00/19324 A1 | 4/2000 |
| WO | 00/31644 | 6/2000 |
| WO | 00/48062 | 8/2000 |
| WO | 00/48063 | 8/2000 |
| WO | 00/52900 A1 | 9/2000 |
| WO | 00/54125 | 9/2000 |
| WO | 00/54126 | 9/2000 |
| WO | 00/58859 | 10/2000 |
| WO | 00/73880 | 12/2000 |
| WO | 00/73904 | 12/2000 |
| WO | 00/73913 A1 | 12/2000 |
| WO | 01/09781 A2 | 2/2001 |
| WO | 01/13198 | 2/2001 |
| WO | 01/23980 | 4/2001 |
| WO | 01/27722 A1 | 4/2001 |
| WO | 01/65334 | 9/2001 |
| WO | 01/65366 A1 | 9/2001 |

OTHER PUBLICATIONS

Bontchev, V., "Possible Virus Attacks Against Integrity Programs and How to Prevent Them," *Virus Bulletin Conference*, pp. 131-141 (Sep. 1992).

Radai, Y., "Checksumming Techniques for Anti-Viral Purposes," *Virus Bulletin Conference*, pp. 39-68 (Sep. 1991).
Schneck, P.B., "Persistent Access Control to Prevent Piracy of Digital Information," *Proceedings of the IEEE*, vol. 87, No. 7, pp. 1239-1250 (Jul. 1999).
IBM Corp., "System for Detecting Undesired Alteration of Software," *IBM Technical Disclosure Bulletin*, vol. 32, No. 11, pp. 48-50 (Apr. 1990).
Anderson, R. and Markus Kuhn, "Tamper Resistance—a Cautionary Note," *Proceedings of the Second USENIX Workshop on Electronic Commerce*, Oakland CA, pp. 1-11 (Nov. 1996).
Berger, J.L., et al., "Compartmented Mode Workstation: Prototype Highlights," *IEEE Transactions on Software Engineering*, vol. 16, No. 6, pp. 608-618 (Jun. 1990).
Chaum, D., "Security Without Identification: Transaction Systems to Make Big Brother Obsolete," *Communications of the ACM*, vol. 28, No. 10, pp. 1030-1044 (Oct. 1985).
"HP Virtualvault—Trusted Web-Server Platform—Product Brief," Hewlett-Packard, 6 pages, located at Internet address <http:www.hp.com/security/products/virtualvault/papers/brief 4.0>.
"Information technology-Security techniques-Entity Authentication—Part 3: Mechanisms using digital signature techniques," *ISO/IEC 9798-3*, 6 pages (1998).
"Information technology-Security techniques-Key management—Part 3: Mechanisms using asymmetric techniques," *ISO/IEC 11770-3*, pp. 1-23 and Annexes A-E (1999).
"Secure Computing with Java: Now and the Future," Sun Microsystems, 29 pages, located at Internet address <http://java.sun.com/marketing/collateral/security.html>.
The Trusted Computing Platform Alliance, "Building a Foundation of Trust in the PC,", 9 pages, located at Internet address <www.trustedpc.org/home/home.html> (Jan. 2000).
Trusted Computing Platform Alliance, Main Specification Version 1.0, 284 pages (Jan. 25, 2001).
Wiseman, S., et al, "Trusted Path between SMITE and the User," *IEEE Proceedings of the Symposium on Security and Privacy*, pp. 147-155 (1988).
Choo, T.H., et al., "Trusted Linux: A Secure Platform for Hosting Compartmented Applications," *Enterprise Solutions*, pp. 1-14 (Nov./Dec. 2001).
Dalton, C., et al., "An operating system approach to securing e-services," *Communications of the ACM*, vol. 44, Issue 2 (Feb. 2001).
Dalton, C., et al., "Applying Military Grade Security to the Internet," *Computer Networks and ISND Systems*, vol. 29, pp. 1799-1808 (1997).
Dalton, C.I., et al., "Design of secure UNIX," Elsevier Information Security Report, (Feb. 1992).
Hallyn, S.E., et al., "Domain and Type Enforcement for Linux," Internet: <http://www.usenix.org/publications/library/proceedings/als2000/full_papers/hallyn/hallyn_html/>. (Retrieved Apr. 24, 2002).
Loscocco, P., et al., "Integrating Flexible Support for Security Policies into the Linux Operating System," Internet: <www.nsa.gov/selinux> (Retrieved Apr. 24, 2002).
Milojicic, D., et al., "Process Migration," Internet: <http://www.hpl.hp.com/techreports/1999/HPL-1999-21.html.> pp. 1-48 (Dec. 5, 1998).
Scheibe, M., "TCPA Security: Trust your Platform!" *Quarterly Focus PC Security*, pp. 44-47. Internet: <http://www.silicon-trust.com/pdf/secure_PDF/Seite_44-47.pdf>.
Senie, D., "Using the SOCK_PACKET mechanism in Linux to gain complete control of an Ethernet Interface," Internet: >http://www.senie.com/dan/technology/sock_packet.html>. (Retrieved Apr. 24, 2002).
Yee, B., "Using Secure Coprocessors," Doctoral thesis—Carnegie Mellon University, pp. 1-94 (May 1994).
*Boot Integrity Services Application Programming Interface*, Version 1.0, Intel Corporation, pp. 1-60 (Dec. 28, 1998).
"NIST Announces Technical Correction to Secure Hash Standard," Internet: <http://www.nist.gov/public_affairs/releases/hashstan.htm> pp. 1-2 (Oct. 24, 2002).
"Norton AntiVirus 5.0 Delux," *PC Magazine Online; The 1999 Utility Guide: Desktop Antivirus*, pp. 1-2, Internet: <http://wwww.zdnet.com/pcmag/features/utilities99/deskav07.html> (Retrieved Nov. 30, 2001).
"Secure Execution Environments, Internet Safety through Type-Enforcing Firewalls," Internet: <thp://www.ghp.com/research/nailabs/secure-execution/internet-safety.asp> (Retrieved Apr. 24, 2002).
*Sophos Anti-Virus for Notes/Domino Release Notes*, Version 2.0, pp. 1-2, Internet: <http://www.sophos.com/sophos/products/full/readmes/readnote.txt> (Retrieved Nov. 30, 2001).
*Trusted Computing Platform Alliance (TCPA), TCPA Design Philosophies and Concepts*, Version 1.0, Internet: <www.trustedpc.org> pp. 1-30 (Jan. 2001).
U.S. Appl. No. 09/728,827, filed Nov. 28, 2000, Proudler et al.
U.S. Appl. No. 10/075,444, filed Feb. 15, 2002, Brown et al.
U.S. Appl. No. 10/080,466, filed Feb. 22, 2002, Pearson et al.
U.S. Appl. No. 10/165,840, filed Jun. 7, 2002, Dalton.
U.S. Appl. No. 10/175,183, filed Jun. 18, 2002, Griffin et al.
U.S. Appl. No. 10/175,185, filed Jun. 18, 2002, Pearson et al.
U.S. Appl. No. 10/175,395, filed Jun. 18, 2002, Pearson et al.
U.S. Appl. No. 10/175,542, filed Jun. 18, 2002, Griffin et al.
U.S. Appl. No. 10/175,553, filed Jun. 18, 2002, Griffin et al.
U.S. Appl. No. 10/206,812, filed Jul. 26, 2002, Proudler.
U.S. Appl. No. 10/240,137, filed Sep. 26, 2002, Dalton et al.
U.S. Appl. No. 10/240,139, filed Sep. 26, 2002, Choo et al.
U.S. Appl. No. 10/303,690, filed Nov. 21, 2002, Proudler et al.
Burke, J.P., "Security Suite Gives Sniffer Programs Hay Fever," *Professional*, vol. 8, No. 9, 3 pages total (Sep. 1994).
U.S. Appl. No. 09/979,902, filed Nov. 27, 2001, Proudler et al.
U.S. Appl. No. 09/979,903, filed Nov. 27, 2001, Proudler et al.
U.S. Appl. No. 10/080,476, filed Feb. 22, 2002, Proudler et al.
U.S. Appl. No. 10/080,477, filed Feb. 22, 2002, Brown et al.
U.S. Appl. No. 10/080,478, filed Feb. 22, 2002, Pearson et al.
U.S. Appl. No. 10/080,479, filed Feb. 22, 2002, Pearson et al.
U.S. Appl. No. 10/194,831, filed Jul. 11, 2002, Chen et al.
U.S. Appl. No. 10/208,718, filed Jul. 29, 2002, Chen et al.
U.S. Appl. No. 10/240,138, filed Sep. 26, 2002, Choo.
Barkley, J., et al., "Managing Role/Permission Relationships Using Object Access Types," *ACM*, pp. 73-80, Jul. 1998, retrieved Jun. 25, 2005.
Grimm, R., et al., "Separating Access Control Policy, Enforcement, and Functionality in Extensible Systems," *ACM* pp. 36-70, Feb. 2001, retrieved Jun. 25, 2005.
Jaeger, T., et al., "Requirements of Role-Based Access Control for Collaborative Systems," *ACM*, pp. 53-64, Dec. 1996, retrieved Jun. 25, 2005.
Naor, M., et al., "Secure and Efficient Metering," Internet: <http://citeseer.nj.com/naor98secure.html> Sections 1-1.3 (1998).
P. C Magazine Online; The 1999 Utility Guide: Desktop Antivirus; Norton Antivirus 5.0 DeLux, Internet.
The Trusted Computing Platform Alliance, "Building Foundation of Trust in the PC,", 9 pages, located at Internet address <www.trustedpc.org/home/home.html.> (Jan. 2000).
Zhang, N.X., et al., "Secure Code Distribution," pp. 76-79, 1997 *IEEE*, retrieved Jun. 25, 2005.
Ford, B., et al., "Microkernels Meet Recursive Virtual Machines", Operating Systems Review, ACM, vol. 30, No. Special Issue, pp. 137-151 (Dec. 21, 1996).
Goldberg, R.P., "Survey of Virtual Machine Research", Computer, IEEE Service Center, vol. 7, No. 6, pp. 34-45 (Jun. 1974).
Popek, G. J., "Formal Requirements for Virtualizable Third Generation Architectures", Communications of the Association for Computing Machinery, ACM, vol. 17, No. 7, pp. 412-421 (Jul. 1974).
EDS Timeline, The 1960's, at EDS.com.
European Search Report, European Patent Office, European Patent Application No. 01305748.4, Oct. 29, 2009.

* cited by examiner

PERFORMANCE OF A SERVICE ON A COMPUTING PLATFORM

CROSS REFERENCE TO RELATED APPLICATIONS

The subject matter of the present application may also be related to the following U.S. patent applications: "Operation of Trusted State in Computing Platform," Ser. No. 09/728,827, filed Nov. 28, 2000; "Secure E-Mail Handling Using a Compartmented Operating System," Ser. No. 10/075,444, filed Feb 15, 2002; "Electronic Communication," Ser. No. 10/080,466, filed Feb. 22, 2002; "Demonstrating Integrity of a Compartment of a Compartmented Operating System," Ser. No. 10/165,840, filed Jun 7, 2002; "Multiple Trusted Computing Environments with Verifiable Environment Entities," Ser. No. 10/175,183, filed Jun. 18, 2002; "Renting a Computing Environment on a Trusted Computing Platform," Ser. No. 10/175,185, filed Jun. 18, 2002; "Interaction with Electronic Services and Markets," Ser. No. 10/175,395, filed Jun. 18, 2002; "Multiple Trusted Computing Environments," Ser. No. 10/175,542, filed Jun. 18, 2002; "Performing Secure and Insecure Computing Operations in a Compartmented Operating System," Ser. No. 10/175,553, filed Jun. 18, 2002; "Privacy of Data on a Computer Platform," Ser. No. 10/206,812, filed Jul. 26, 2002; "Trusted Operating System," Ser. No. 10/240,137, filed Sep. 26, 2002; "Trusted Gateway System," Ser. No. 10/240,139, filed Sep. 26, 2002; and "Apparatus and Method for Creating a Trusted Environment," Ser. No. 10/303,690, filed Nov. 21, 2002.

FIELD OF INVENTION

The invention relates to performance of services on a computing platform, and to a computing platform suitable for performing services, particularly where reliable or trusted performance of some or all of the service is required.

PRIOR ART

In normal commercial life, when two parties agree that one will perform a service for another, a written contract is frequently created which specifies not only the rights and obligations of the parties but also specifies key aspects of how the service is to be performed. It is desirable also for evidence to be recorded so that it can be determined whether the service has been satisfactorily performed. Increasingly, services are provided electronically by a computing platform. Application of use of contracts, and mechanisms for providing evidence that contracts have been satisfactorily performed, are currently lacking in this context.

SUMMARY OF INVENTION

For the same reasons as in normal commercial life (guidance to both parties, resolution of disputes) it is desirable for something analogous to a written contract to exist, and also for evidence of performance of the contract to exist. Accordingly, the invention provides method of performing a service for a requester on a computing platform, comprising: the requester providing a specification of the service to be performed to the computing platform, wherein the specification of the service establishes specified levels of trust for at least some of the processes in the service; the computing platform executing the service according to the specification and logging performance of at least some of the processes for which a level of trust was specified; and the computing platform providing the requester with a log of the performance of the processes performed according to the specified levels of trust.

The invention thus allows for the provision of evidence of satisfactory performance of services on a computing platform in response to an electronically received request. The service can be specified to the computing platform, and in addition to the results of the service (if these are required by the requestor—these may be required elsewhere) the requestor is provided with evidence that the service has been satisfactorily performed by the computing platform.

Provision of evidence is of value in itself. Even greater value is provided to the requester by the ability to designate particular processes in the service as requiring some level of trust, typically greater than that obtainable in the normal computing environment of the computing platform. Evidence that these processes have been performed in accordance with the required level of trust provides valuable evidence of successful performance of the service.

Advantageously, the computing platform contains a physically and logically protected computing environment. This may be adapted to conduct a monitoring process for measuring integrity of the computing platform. This protected computing environment may be that provided by a "trusted component" as described in the applicant's copending International Patent Application No. PCT/GB00/00528 entitled "Trusted Computing Platform" and filed on Feb. 15, 2000. An integrity metric of the computing platform at the time the service was carried out may be returned to the requestor along with the evidence that the service was carried out in accordance with the required levels of trust.

Preferably, a service management process allocates the execution of processes and logging of performance to discrete computing environments in or associated with the computing platform. This process may be located within the protected computing environment.

These discrete computing environments may be compartments, each containing a computing engine protected against influence from outside the compartment by operational or environmental constraints. An example of a compartment would be a Java sandbox, containing a Java Virtual Machine. Such compartments can be located inside or outside a protected computing environment (or both).

Computing engines may be prevented from carrying out operations on particular input data in the execution of processes allocated to them. This may be achieved by typing: input data is provided with a data type, and a process is provided with operation types, and an operation in the process is prevented if operation types and data types are not consistent.

Performance logging may include logging of some or all of the input data to a process, the output data from a process, and the program instructions executed in a process. All of this data can be logged, or some or all of the data can be sampled (particularly useful in the case of program instruction data). It is desirable for sampling to be irregular, for example according to a function which is initialised with a nonce or random value (which itself may form part of the performance logging data). Performance logging data may be encrypted before it is returned to the requester. Performance logging parameters may be determined in the original service specification, or may be determined by the service management process.

In a further aspect, the invention provides a computing platform, comprising: a physically and logically protected computing environment, adapted to provide trustworthy data to appropriate users of the computing platform; and one or more compartments, arranged to operate in a sufficiently constrained manner that processes executed in a compartment are performed reliably; wherein specified processes may be executed for a user in the one or more compartments and the results of the specified processes returned to the user in trustworthy data from the protected computing environment.

Such a computing platform is particularly well adapted to perform a service for a user and provide evidence that processes of the service have been performed according to a required level of trust.

BRIEF DESCRIPTION OF THE DRAWINGS

A preferred embodiment of the present invention will now be described by way of example only with reference to the accompanying drawings in which.

BEST MODE FOR CARRYING OUT THE INVENTION, & INDUSTRIAL APPLICABILITY

Figure 1:
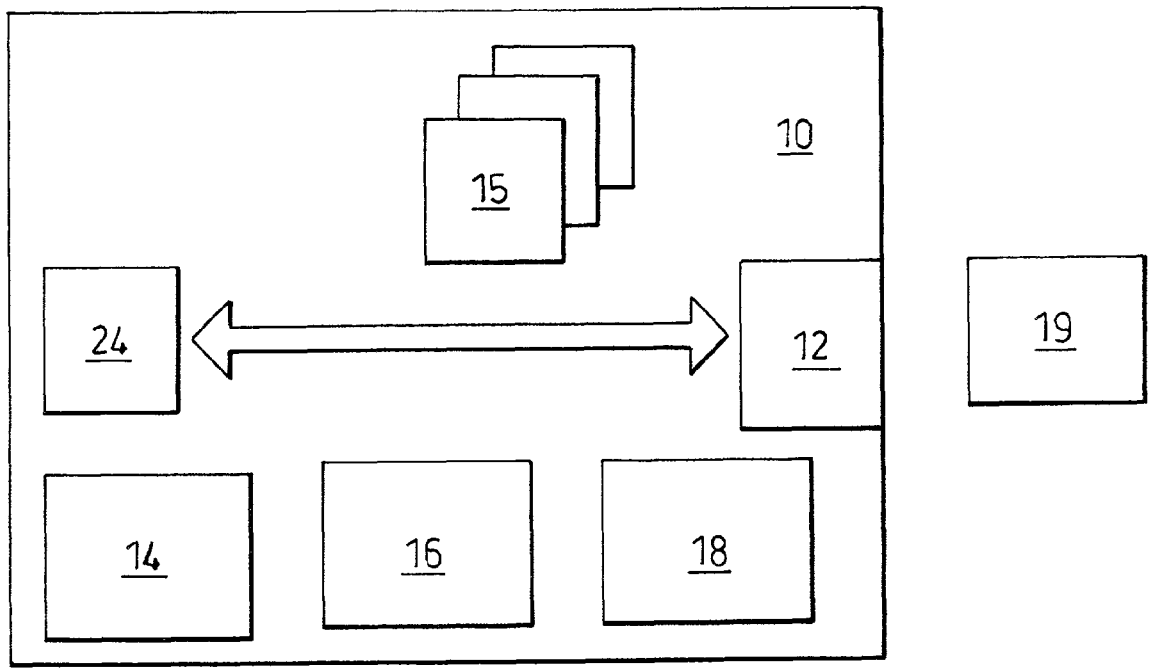
FIG. 1 is a diagram that illustrates a computing platform containing a trusted device and suitable for use in embodiments of the present invention.

Before describing embodiments of the present invention, a trusted computing platform of a type generally suitable for carrying out embodiments of the present invention will be described with relevance to FIGS. 1 to 5. This description of a trusted computing platform describes the essential elements of its construction, its role in providing integrity metrics indicating the state of the computing platform to a user of that platform, and communication of such metrics to a user. A "user", in this context, may be a remote user such as a remote computing entity (the requester, in embodiments of the present invention, may fall into this category). A trusted computing platform is further described in the applicant's International Patent Application No. PCT/GB00/00528 entitled "Trusted Computing Platform" and filed on Feb. 15, 2000, the contents of which are incorporated by reference herein. The skilled person will appreciate that the present invention does not rely for its operation on use of a trusted computing platform precisely as described below: use of such a trusted computing platform is one, rather than the only possible, manner of achieving functionality required in the present invention.

A trusted computing platform of the kind described here is a computing platform into which is incorporated a physical trusted device whose function is to bind the identity of the platform to reliably measured data that provides an integrity metric of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. (Optionally the trusted device will refuse to provide evidence of identity if it itself was unable to verify correct operation of the platform.) The user receives the proof of identity and the identity metric, and compares them against values which it believes to be true. Those proper values are provided by the TP or another entity that is trusted by the user. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, as will generally be the case in embodiments of the present invention, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. It will be appreciated that, although tamper-proofing is a most desirable feature of the present invention, it does not enter into the normal operation of the invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

A trusted platform 10 is illustrated in the diagram in FIG. 1. The platform 10 includes the standard features of a keyboard 14, mouse 16 and visual display unit (VDU) 18, which provide the physical 'user interface' of the platform. This embodiment of a trusted platform also contains a smart card reader 12—a smart card reader is not an essential element of all trusted platforms, but is employed in various preferred embodiments described below. Along side the smart card reader 12, there is illustrated a smart card 19 to allow trusted user interaction with the trusted platform (use of a smart card for local trusted user interaction with a trusted platform is not of general relevance to function of the present invention, although embodiments of the present invention, may be used in this context, and is not described in detail herein this aspect is further described in the applicant's International Patent Application No. PCT/GB00/00751, entitled "Smartcard User Interface for Trusted Computing Platform", and filed on Mar. 3, 2000, the contents of which application are incorporated by reference herein). In the platform 10, there are a plurality of modules 15: these are other functional elements of the trusted platform of essentially any kind appropriate to that platform (the functional significance of such elements is not relevant to the present invention and will not be discussed further herein).

Figure 2:
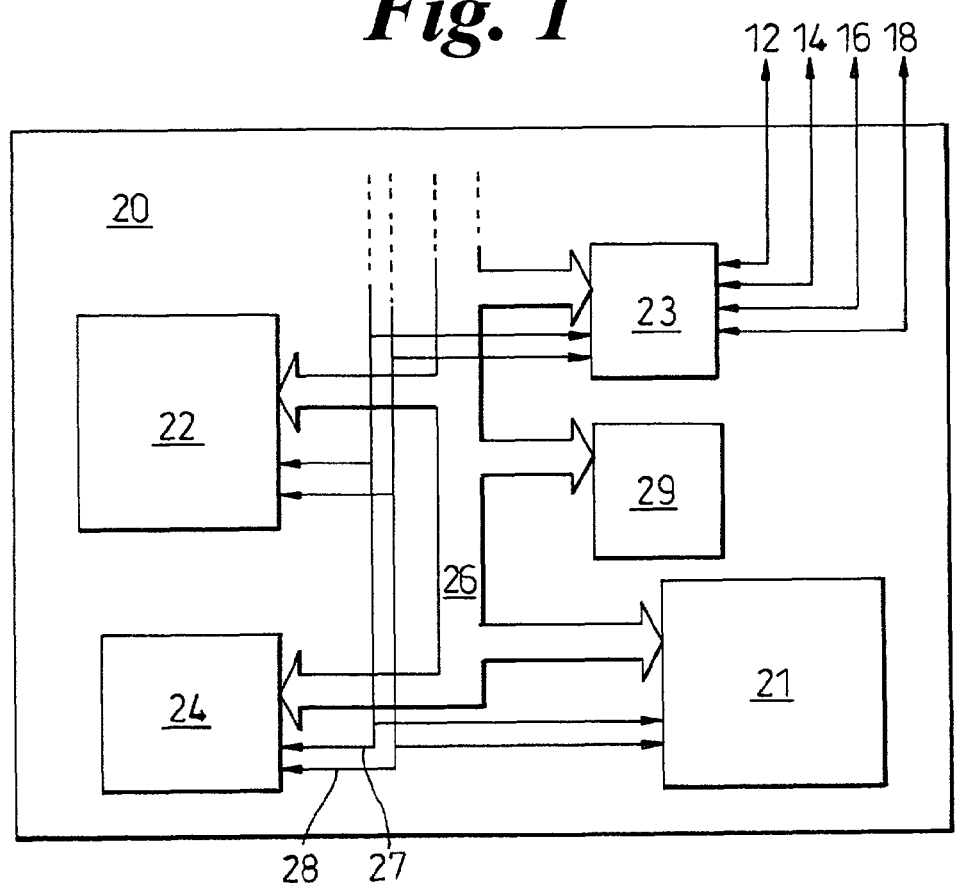
FIG. 2 is a diagram which illustrates a motherboard including a trusted device arranged to communicate with a smart card via a smart card reader and with a group of modules.

As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (10) device 23, which controls interaction between the components of the motherboard and the smart card reader 12, the keyboard 14, the mouse 16 and the VDU 18. The main memory 22 is typically random access memory (RAM). In operation, the platform 10 loads the operating system, for example Windows NT™, into RAM from hard disk (not shown). Additionally, in operation, the platform 10 loads the processes or applications that may be executed by the platform 10 into RAM from hard disk (not shown).

Typically, in a personal computer the BIOS program is located in a special reserved memory area, the upper 64K of the first megabyte do the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT (TM), which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Although, in the trusted computing platform embodiment to be described, the trusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

Figure 3:
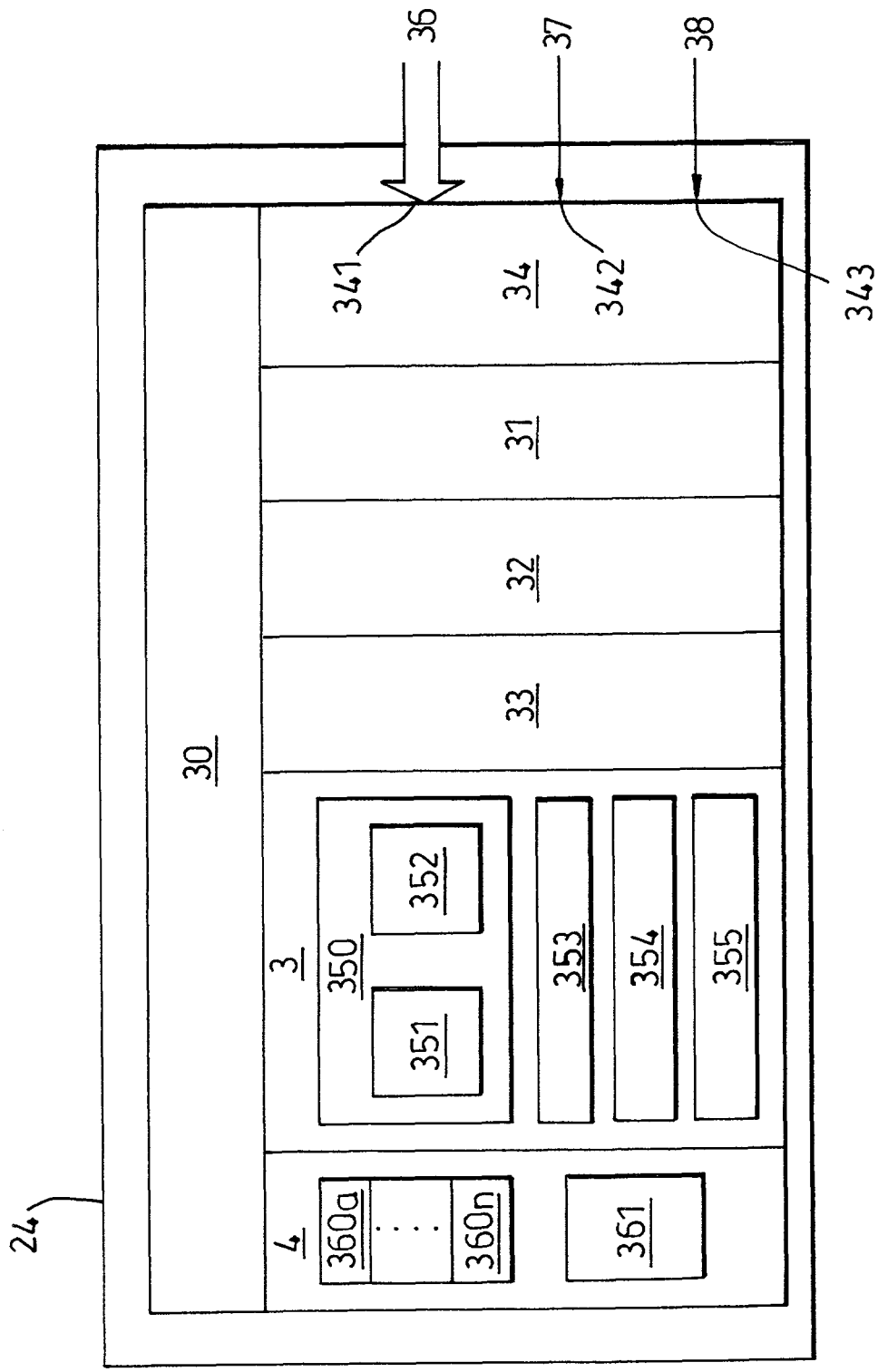
FIG. 3 is a diagram that illustrates the trusted device in more detail.

The trusted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface. In a particularly preferred arrangement, the display driver for the computing platform is located within the trusted device 24 with the result that a local user can trust the display of data provided by the trusted device 24 to the display—this is further described in the applicant's International Patent Application No. PCT/GB00/02005, entitled "System for Providing a Trustworthy User Interface" and filed on May 25, 2000, the contents of which are incorporated by reference herein.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a-360n of one or more authentic smart cards 19s that can be used to gain access to the platform 10.

In one preferred implementation, as well as the digest, the integrity metric includes a Boolean value, which is stored in volatile memory 4 by the measurement function 31, for reasons that will become apparent.

Figure 4:
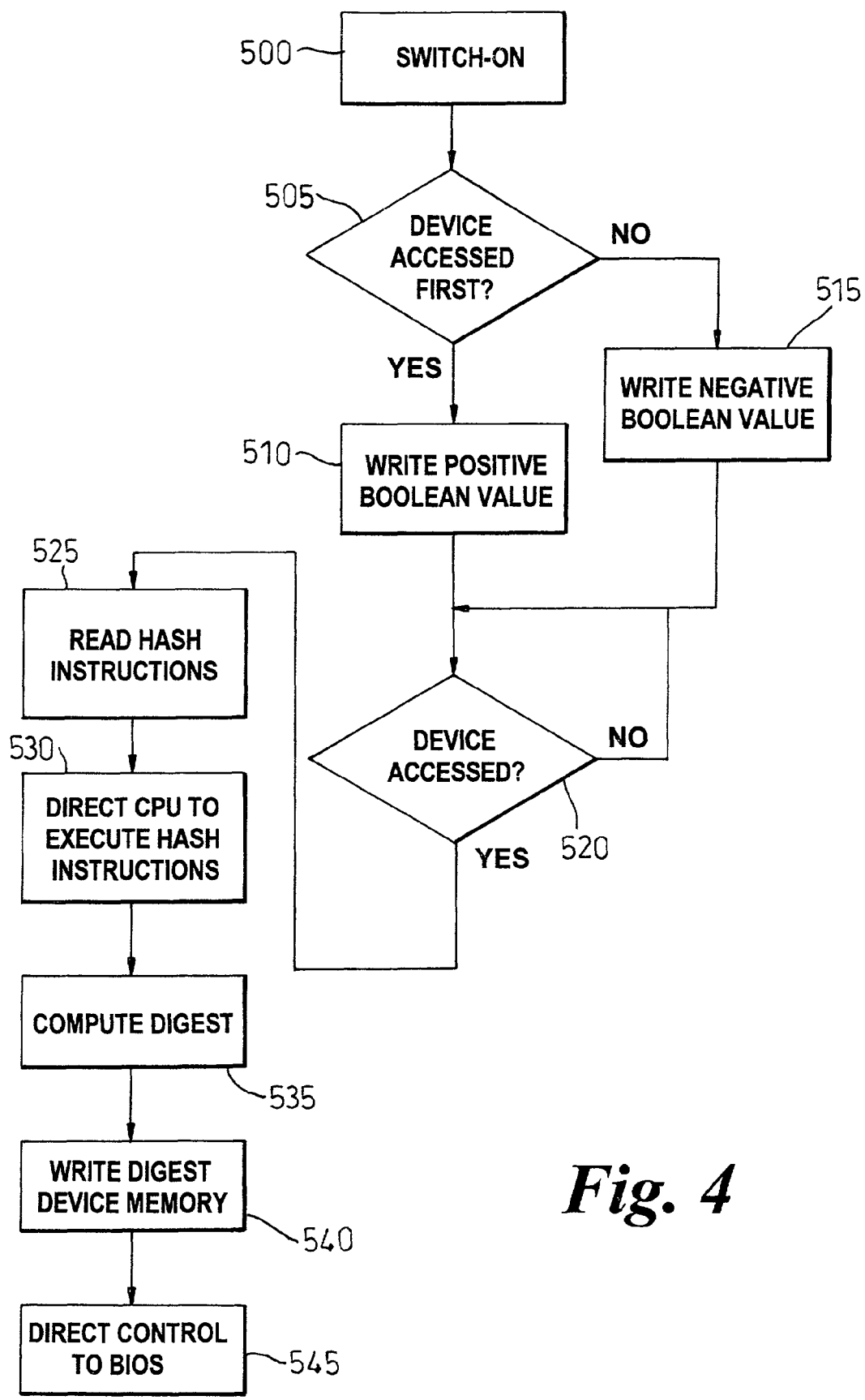
FIG. 4 is a flow diagram which illustrates the steps involved in acquiring an integrity metric of the computing apparatus.

A preferred process for acquiring an integrity metric will now be described with reference to FIG. 4.

In step 500, at switch-on, the measurement function 31 monitors the activity of the main processor 21 on the data, control and address lines (26, 27 & 28) to determine whether the trusted device 24 is the first memory accessed. Under conventional operation, a main processor would first be directed to the BIOS memory first in order to execute the BIOS program. However, in accordance with the present embodiment, the main processor 21 is directed to the trusted device 24, which acts as a memory. In step 505, if the trusted device 24 is the first memory accessed, in step 510, the measurement function 31 writes to volatile memory 3 a Boolean value which indicates that the trusted device 24 was the first memory accessed. Otherwise, in step 515, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

In step 520, when (or if) accessed as a memory by the main processor 21, the main processor 21 reads the stored native hash instructions 354 from the measurement function 31 in step 525. The hash instructions 354 are passed for processing by the main processor 21 over the data bus 26. In step 530, main processor 21 executes the hash instructions 354 and uses them, in step 535, to compute a digest of the BIOS memory 29, by reading the contents of the BIOS memory 29 and processing those contents according to the hash program. In step 540, the main processor 21 writes the computed digest 361 to the appropriate non-volatile memory location 4 in the trusted device 24. The measurement function 31, in step 545, then calls the BIOS program in the BIOS memory 29, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or coprocessors, on the platform could be verified by enacting fixed challenge/response interactions to ensure consistent results. Where the trusted device 24 is a separable component, some such form of interaction is desirable to provide an appropriate logical binding between the trusted device 14 and the platform. Also, although in the present embodiment the trusted device 24 utilises the data bus as its main means of communication with other parts of the platform, it would be feasible, although not so convenient, to provide alternative communications paths, such as hard-wired paths or optical paths. Further, although in the present embodiment the trusted device 24 instructs the main processor 21 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value. Additionally, or alternatively, the trusted device 24 may inspect the Boolean value and not pass control back to the BIOS if the trusted device 24 was not the first memory accessed. In either of these cases, an appropriate exception handling routine may be invoked.

Figure 5:
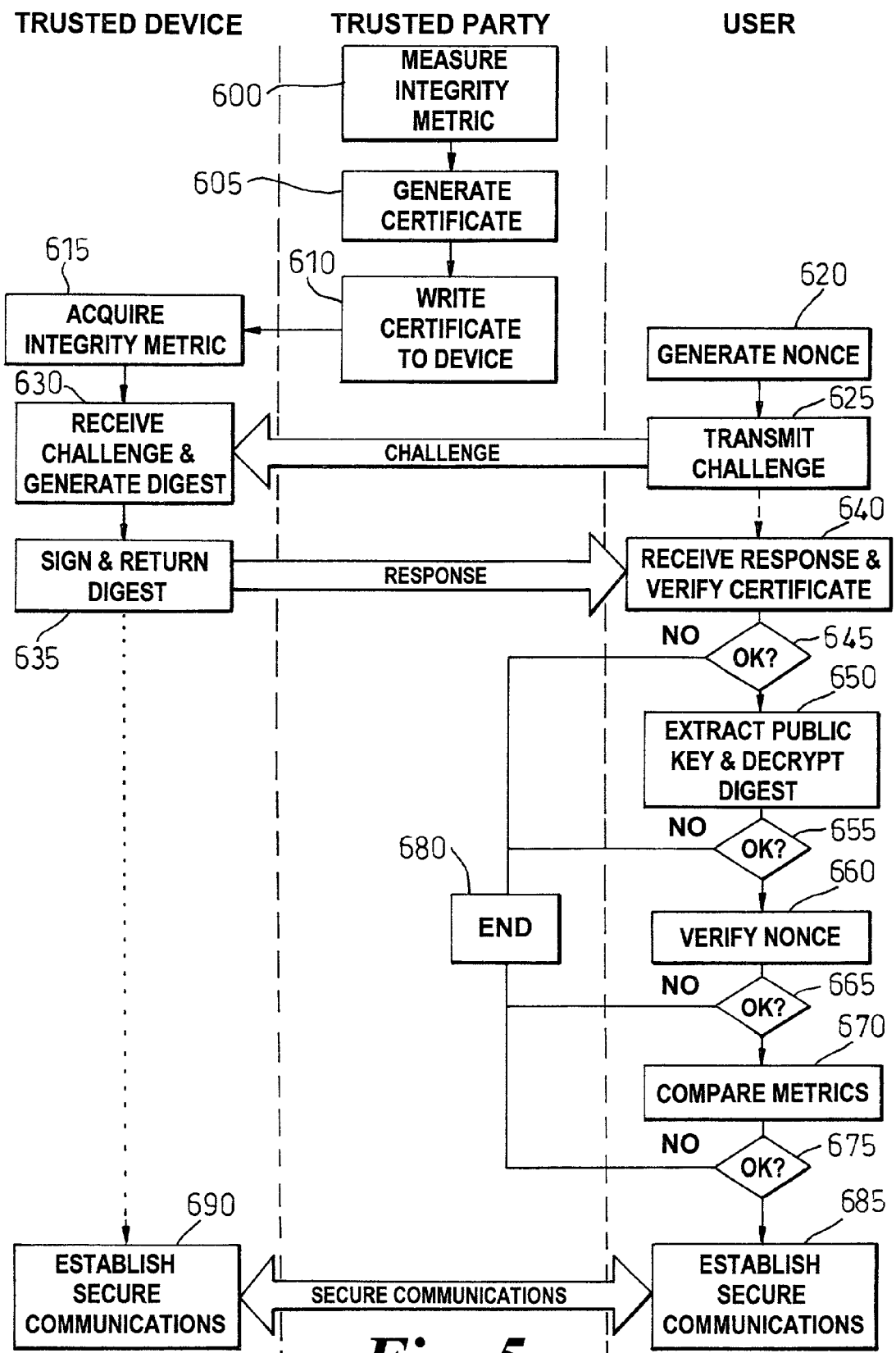
FIG. 5 is a flow diagram which illustrates the steps involved in establishing communications between a trusted computing platform and a remote platform including the trusted platform verifying its integrity.

FIG. 5 illustrates the flow of actions by a TP, the trusted device 24 incorporated into a platform, and a user (of a remote platform) who wants to verify the integrity of the trusted platform. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is anticipated that, for a high level of integrity, the software application would reside on a smart card of the user, who would insert the smart card into an appropriate reader for the purposes of verification.

At the first instance, a TP, which vouches for trusted platforms, will inspect the type of the platform to decide whether to vouch for it or not. This will be a matter of policy. If all is well, in step 600, the TP measures the value of integrity metric of the platform. Then, the TP generates a certificate, in step 605, for the platform. The certificate is generated by the TP by appending the trusted device's public key, and optionally its ID label, to the measured integrity metric, and signing the string with the TP's private key.

The trusted device 24 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 610, the trusted device 24 is initialised by writing the certificate 350 into the appropriate non-volatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communications is supported by a 'master key', known only to the TP, that is written to the trusted device (or smart card) during manufacture, and used to enable the writing of data to the trusted device 24; writing of data to the trusted device 24 without knowledge of the master key is not possible.

At some later point during operation of the platform, for example when it is switched on or reset, in step 615, the trusted device 24 acquires and stores the integrity metric 361 of the platform.

When a user wishes to communicate with the platform, in step 620, he creates a nonce, such as a random number, and, in step 625, challenges the trusted device 24 (the operating system of the platform, or an appropriate software application, is arranged to recognise the challenge and pass it to the trusted device 24, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 630, the trusted device 24 receives the challenge and creates an appropriate response. This may be a digest of the measured integrity metric and the nonce, and optionally its ID label. Then, in step 635, the trusted device 24 signs the digest, using its private key, and returns the signed digest, accompanied by the certificate 350, to the user.

In step 640, the user receives the challenge response and verifies the certificate using the well known public key of the TP. The user then, in step 650, extracts the trusted device's 24 public key from the certificate and uses it to decrypt the signed digest from the challenge response. Then, in step 660, the user verifies the nonce inside the challenge response. Next, in step 670, the user compares the computed integrity metric, which it extracts from the challenge response, with the proper platform integrity metric, which it extracts from the certificate. If any of the foregoing verification steps fails, in steps 645, 655, 665 or 675, the whole process ends in step 680 with no further communications taking place.

Assuming all is well, in steps 685 and 690, the user and the trusted platform use other protocols to set up secure communications for other data, where the data from the platform is preferably signed by the trusted device 24.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 24, or may alternatively only accept that the platform has the relevant level of integrity if the value of the integrity metric is equal to a value held by the challenger (or may hold there to be different levels of trust in these two cases).

Figure 6:
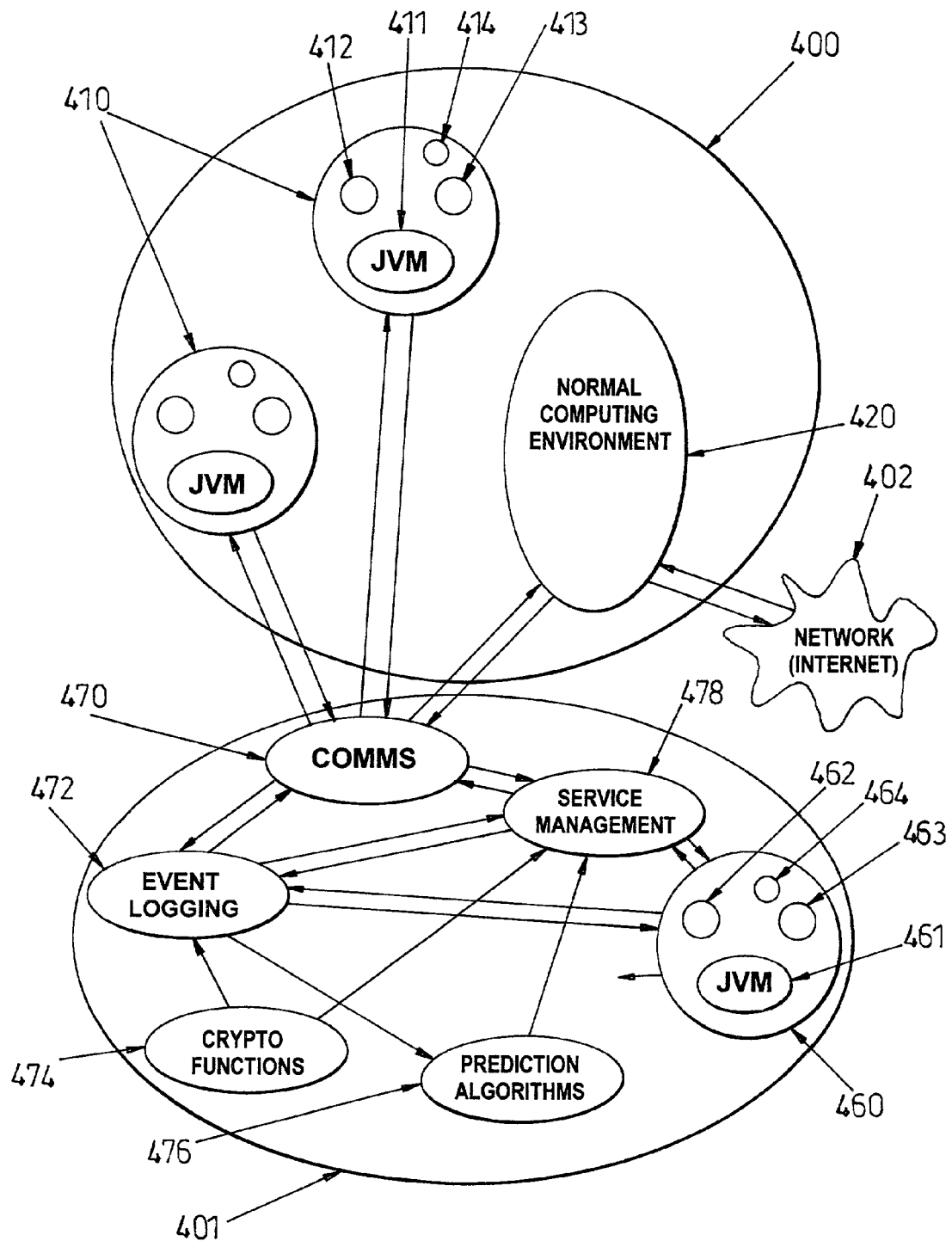
FIG. 6 is a diagram which illustrates schematically the logical architecture of a computing platform as shown in FIG. 1 and adapted for use in embodiments of the present invention.

The description above indicates the general structure, purpose, and interaction behaviour of a trusted computing platform. With reference to FIG. 6, the logical architecture of a trusted computing platform employed in embodiments of the present invention will now be described.

The logical architecture shown in FIG. 6 shows a logical division between the normal computer platform space 400 and the trusted component space 401 matching the physical distinction between the trusted component 24 and the remainder of the computer platform. The logical space (user space) 400 comprises everything physically present on motherboard 20 of computer platform 10 other than trusted component 24: logical space (trusted space) 401 comprises everything present within the trusted component 24.

User space 400 comprises all normal logical elements of a user platform, many of which are not shown here (as they are of no particular significance to the operation of the present invention) or are subsumed into normal computing environment 420, which is under the control of the main operating system of the trusted computing platform. The logical space representing normal computing environment 420 is taken here to include normal drivers, including those necessary to provide communication with external networks 402 such as the internet (in the examples shown this is the route taken to communicate with the requester of a service from the trusted platform). Also subsumed here within the normal computing environment 420 logical space are the standard computational functions of the computing platform. The other components shown within user space 400 are compartments 410. These compartments will be described further below.

Trusted space 401 is supported by the processor and memory within trusted component 24. The trusted space 401 contains a communications component for interacting with compartments 410 and normal computing environment 420, together with components internal to the trusted space 401. It is desirable that there be a secure communications path between the normal computing environment 420 and the trusted space 401 (the applicant's copending International Patent Application No. PCT/GB00/00504, filed on Feb. 15, 2000, the contents of which are incorporated by reference herein)—alternative embodiments may include a direct connection between trusted space 401 and external networks 402 which does not include the user space 400—in the present arrangement, information that is only to be exchanged between the trusted space 401 and a remote user will pass encrypted through user space 400. The trusted space 401 also contains: an event logger 472 for collecting data obtained from different operations and providing this data in the form desired by a party who wishes to verify the integrity of these operations; cryptographic functions 474 which are required (as described below) in communication out of the trusted space 401 and in providing records within the trusted space 401 (for example, by the event logger 472); prediction algorithms 476 used to determine whether logged events conform to what is expected; and a service management function 478 which arranges the performance of services which are to be performed in a trusted manner (it would be possible in alternative embodiments for service management function to reside in the user space 400, but this would require a larger amount of encrypted communication and monitoring of the service management function 478 itself residence of the service management function 478 within the trusted space 401 provides for a simpler solution). Also resident within the trusted space 401 is a trusted compartment 460.

Compartments 410, 460 will now be described further. A compartment 410, 460 is an environment containing a virtual computing engine 411, 461 wherein the actions or privileges of processes running on these virtual computing engines are restricted. Processes to be performed on the computing engine within a compartment will be performed with a high level of isolation from interference and prying by outside influences. Such processes are also performed with a high level of restriction on interference or prying by the process on inappropriate data. These properties are the result of the degree of reliability, because of the restrictions placed on the compartment, even though there is not the same degree of protection from outside influence that is provided by working in the trusted space 401. A well known form of compartment is a Java sandbox, in which case the virtual computing engine 411, 461 is a Java Virtual Machine (JVM). Java Virtual Machines and the handling of security within Java are described at the Sun Microsystems Java web site. To implement sandboxes, a Java platform relies on three major components: the class loader, the byte-code verifier, and the security manager. Each component plays a key role in maintaining the integrity of the system. Together, these components ensure that: only the correct classes are loaded; the classes are in the correct format; untrusted classes will not execute dangerous instructions; and untrusted classes are not allowed to access protected system resources. Each component is described further in, for example, the white paper entitled "Secure Computing with Java™.: Now and the Future" or in the Java Development Kit 1.1.X. An example of the use of Java Virtual Machines in a compartmental environment is provided by HP Praesidium VirtualVault (basic details of HP Praesidium VirtualVault are described on HP's Internet site at.

Each compartment thus contains a Java Virtual Machine 411,461 as a computational engine for carrying out a process element (to be assigned to the compartment by the service management process 478, as will be described further below). Also contained within each compartment 411,461 is a communications tool 412,462 allowing the compartment to communicate effectively with other system elements (and in particular with the trusted space 401 by means of communications tool 470), a monitoring process 413,463 for logging details of the process carried out on the JVM 411,461 and returning details to the event logger 472 in the trusted space 401, and memory 414,464 for holding data needed by the JVM 411,461 for operation as a compartment and for use by the process element allocated to the compartment.

There are two types of compartment shown in FIG. 6. Compartments 410 are provided in the user space 400, and are protected only through the inherent security of a compartment. Compartments 410 are thus relatively secure against attack or corruption. However, for process elements which are particularly critical or particularly private, it may be desirable to insulate the process element from the user space 400 entirely. This can be achieved by locating a "trusted" compartment 460 within the trusted space 401—the functionality of compartment 460 is otherwise just the same as that of compartment 410. An alternative to locating a trusted compartment 460 physically within the trusted device 24 itself is to locate the trusted compartment 460 within a separate physical element physically protected from tampering in the same way that trusted device 24 is protected—in this case it may also be advantageous to provide a secure communications path between the trusted device 24 and the tamper resistant entity containing the secure compartment 460.

Trusted compartments 460 provide a higher level of trust than components 410 because the "operating system" and "compartment protections" inside trusted module 24 may be hardcoded into hardware or firmware, and access to data or processes outside the trusted space 401 governed by a hardware or firmware gatekeeper. This makes it extremely difficult for a process in a trusted compartment to subvert its controls, or be affected by undesirable processes.

The number of protected compartments 460 provided is a balance between, on the one hand, the amount of highly trusted processing capacity available, and on the other hand, platform cost and platform performance. The number of compartments 410 available is less likely to affect cost significantly, but is a balance between platform performance and the ability to gather evidence about executing processes.

Depending on the complexity of processes to be performed by the trusted computing platform, there may be any number of compartments 410 and trusted compartments 460 used in the system.

Aspects of the invention relate to the use of a service platform (preferably a trusted computing platform) to perform a service for a requester, where the requester requires the service to be performed in a specific manner. In particular, the requestor requires certain service elements within the overall service to be performed with a certain degree of reliability or security. Broadly, the service elements can be divided into three categories: service elements that it is essential be trusted; service elements that are required to be trustworthy, and service elements that need to operate properly for the service to function, but which do not require a special degree of trust. Services that it is essential must be trusted include, typically, those used to report on the state of the software environment in the trusted computing platform (this would be satisfied in principle by appropriate use of a trusted computing platform as shown in FIGS. 1 to 5) and also those that will provide evidence of the execution of the service. Service elements that may be required to be trustworthy are ones where one of the parties involved (most likely the requester) wishes to treat the service element concerned of being of sufficient importance that some kind of guarantee of its integrity is required. An example could be a function that is known to be important to a particular community of interest (for example, in civil engineering it may be particularly important to ensure that certain types of calculation, for example in design of loadbearing components, are performed in an accurate and reliable manner). Other service elements have no specific level of trust associated (although some guarantee of reliability can be provided simply by use of a trusted computing platform to perform the service.

Figure 7:
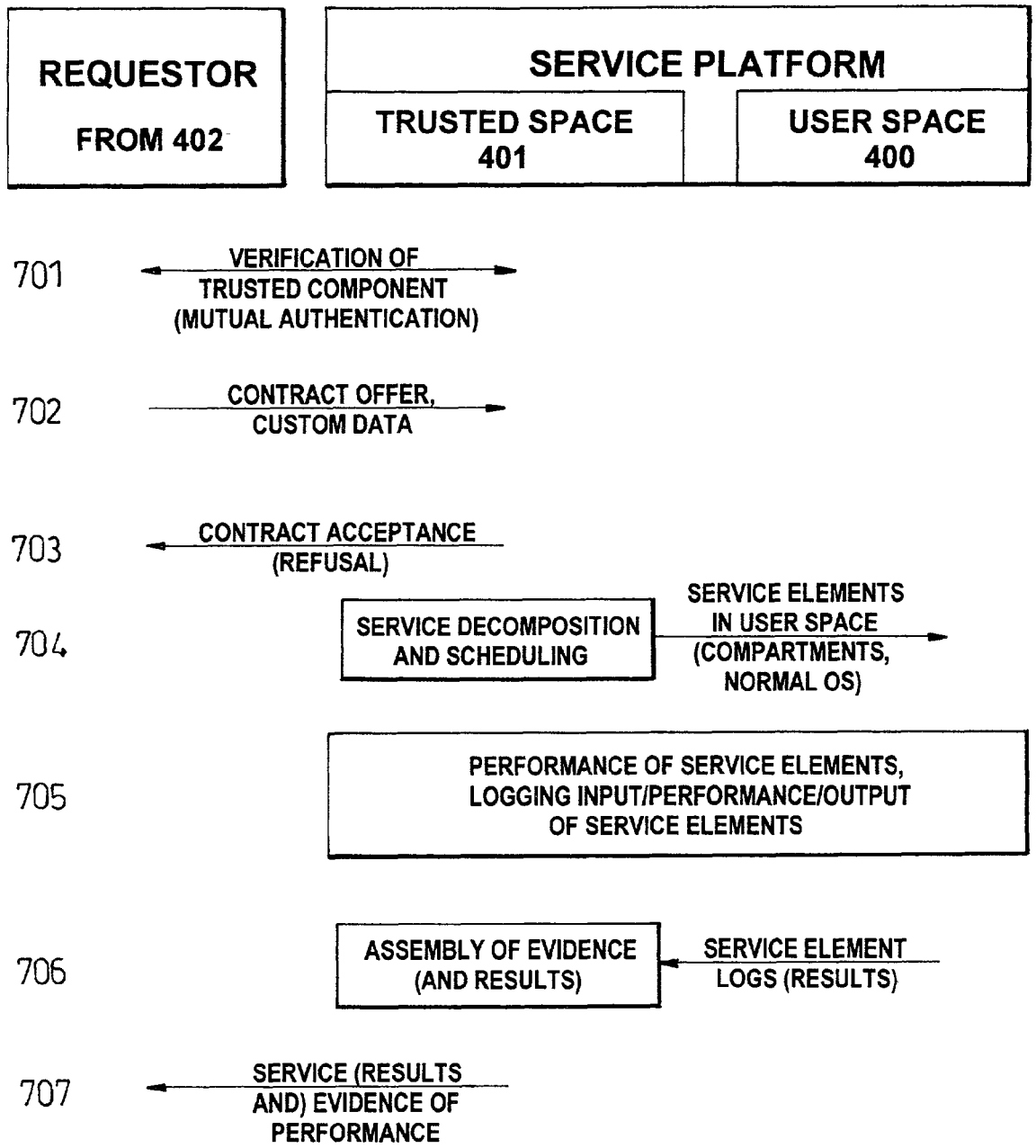
FIG. 7 is a flow diagram illustrating the interactions between a requestor and a computing platform in embodiments of the present invention.

FIG. 7 illustrates the main elements of a process in accordance with embodiments of the invention by which a requestor arranges for a service to be performed on a service platform as shown in FIG. 6. The initial step is for the requestor to verify that the computing platform is a trusted computing platform by authenticating the trusted component 24 in step 701—this process is essentially that shown in FIG. 5. This process may be one of mutual authentication—the trusted computing platform may require that the requestor also be a trusted computing platform before performing certain kinds of service.

In step 702, the requestor sends the material necessary to define the service to the trusted computing platform. There are two elements to this material: one is the "contract", defining the service to be performed and any conditions on the performance of the service, and the other is any custom data required for the performance of the service (data which the requestor does not already know is available to the trusted computing platform, typically). This material is sent in encrypted form for decryption using the cryptographic functions of the trusted component 24, or using cryptographic functions available elsewhere in the computing platform, preferably in cooperation with facilities (such as key storage or session key communication) provided by the trusted component 24. Typically, the requestor secures the material under a session key, and then secures that session key under a key known only to trusted component 24. The requester sends the protected session key and the protected material to the trusted computing platform. The trusted component 24 (specifically, its cryptographic functions 474) recovers the session key and verifies the source and integrity of the material by conventional security methods.

The contract must specify the service sufficiently that the trusted computing platform can interpret how to perform the service—what service elements must be performed, and how they are to be combined so that the results of the service can be returned to the requester (or possibly forwarded to a third party). Moreover, the contract will specify any conditions placed by the requestor on how the service as a whole, or individual service elements, should be performed. Of particular relevance to embodiments of the present invention are requirements that particular service elements (processes) should be performed in a trusted or secure manner. For example, the requestor may require absolute trust to be essential for a first set of processes, high trust to be required for a second set of processes, and no specific requirement for a third set of processes: these requirements may be met by carrying out the first set of processes in trusted compartments 460, the second set of processes in compartments 410, and the third set of processes can be performed in the normal computing environment 420 under the control of the operating system of the computing platform. The requestor may also require evidence of the performance of the contract, both that the contract has been performed reliably but also under the conditions of trust required—typically, this requirement also needs absolute trust, and requires use of the trusted component 24, either in providing a trusted compartment or in providing evidence that normal compartments are executing in a safe environment. As is further described below, evidence can be provided by logging inputs, execution and outputs of processes, particularly those to be carried out in a compartment or a trusted compartment.

More specifically, a contract will normally include the following: the processes that constitute at least a part of the service (it may be that other parts of the whole service offering are to be performed elsewhere, or that the whole service is covered by a "master contract" to which the present contract is ancillary); any processes that must execute on a trusted computing platform (typically, the requirement may be that all processes execute on a trusted computing platform, but not all within compartments or trusted compartments); the order of the processes in the service; and an unambiguous description of the processes (names or sources), possibly together with data to verify the integrity of such a description (such as a signed digest of a program for performing the process). The contract may also specify trust levels, or may specifically indicate that particular processes should be executed within a compartment or a trusted compartment (or should be executed partly within a compartment or trusted compartment—a possibility which is discussed further below). The contract may also determine how integrity of processes is determined: whether inputs and outputs are recorded or perhaps sampled (if so, how they are sampled), and may even determine scheduling of aspects of processes: how execution of processes is sampled; how execution within compartments (or trusted compartments) itself occurs; and how processes are swapped in and out of compartments (or trusted compartments). All this information should be provided in a machine-readable format for interpretation by the trusted computing platform (more specifically, the service management process 478)—a programming method such as ASN.1 is one possibility.

In step 703, the trusted computing platform either accepts or rejects the contract offer. An offer may be rejected if the trusted computing platform does not have the configuration required to perform the service according to the contract requirements (for example, if it does not have trusted compartments available, and these are explicitly or implicitly required by the contract offer), if the trusted computing platform does not trust the requestor, or if the service falls outside other parameters of acceptance programmed into the trusted computing platform. If an appropriate protocol exists, it may be possible to negotiate contract offers at this phase (perhaps by the trusted computing platform indicating which contract terms it cannot meet and offering alternatives, and the requestor deciding whether the alternatives are acceptable or offering new alternatives of its own—the process iterating until a contract is agreed or an impasse is reached).

If the contract offer is accepted, the service can be performed as the trusted computing platform received all necessary information with the contract offer (in an alternative, the custom data may be retained until the trusted computing platform accepts the contract offer, and is provided after the acceptance). In step 704, the service management process 478 in the trusted space 401 partitions the service into processes, and allocates the processes to trusted compartments 460, compartments 410 and the operating system 420 as appropriate. In addition, the service management process 478 assigns with the allocated processes any monitoring processes that are necessary to provide performance evidence. These may be specified in the contract itself, or the service management process 478 may determine a monitoring process necessary to provide a level of evidence required in the contract.

In step 705, the service (or the processes comprising the service) are performed and the necessary evidence logged. Logging of evidence is described in greater detail below. In step 706, results of the service are provided where they are required (this may be to the requestor, or to third parties, or placed in a specific location—this depends on the nature of the service and its purpose) and the results of the evidence logging process returned to the trusted component 24 where they are assembled by the event logger 472 according to a model of the entire service provided by the service management process 478 (again, this will be described in more detail below). The service evidence (and, if the results of the service are to be private to the requestor, the service results) are then encrypted and returned to the requestor in step 707.

Figure 8:
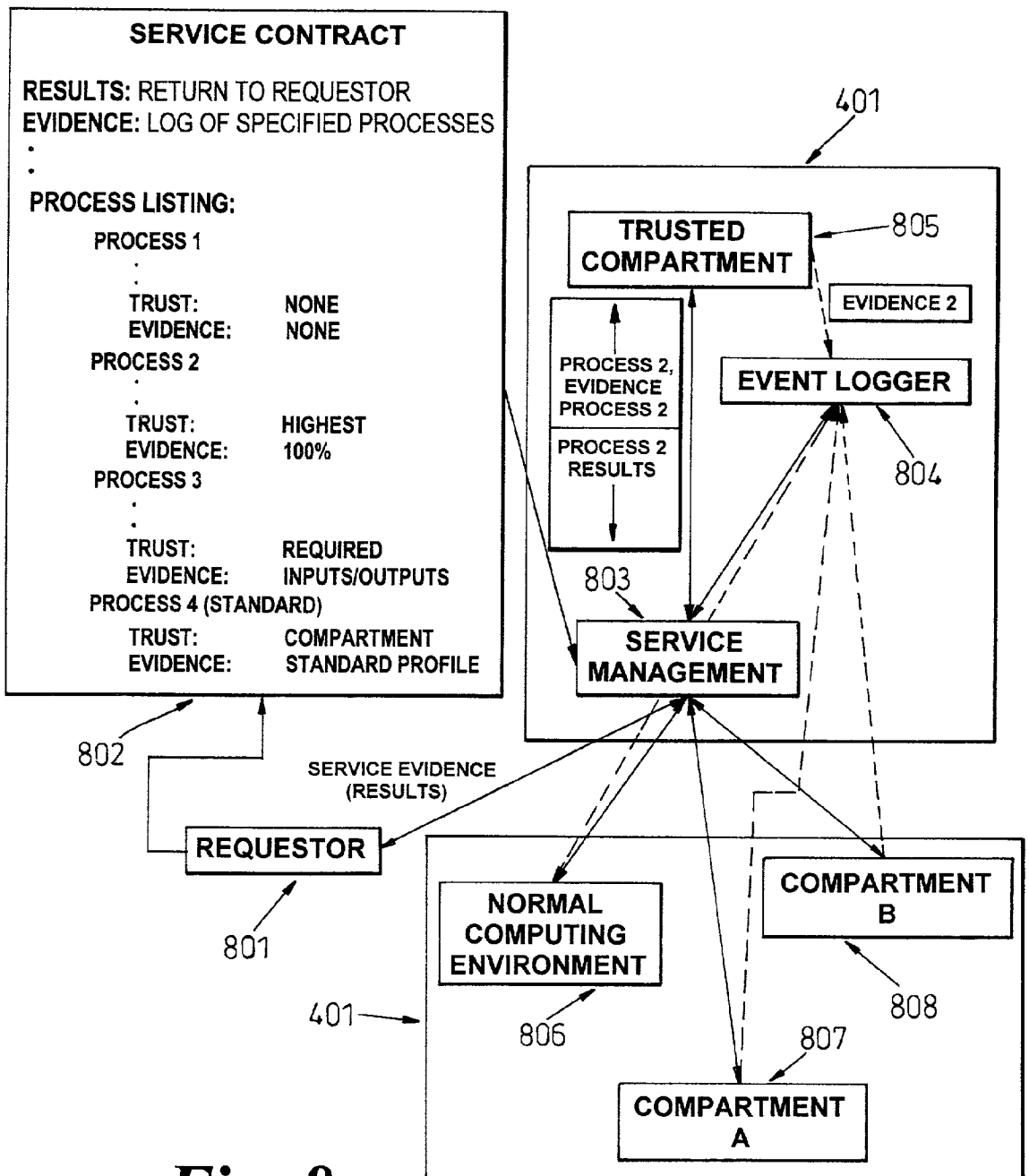
FIG. 8 is a schematic diagram illustrating the performance of a service by the computing platform in accordance with an embodiment of the invention.

The main elements of the performance of a service are shown in FIG. 8. The requestor 801 provides the contract 802 to the trusted computing platform where it is received by the service management process 803. The contract specifies where the results are to be provided (in this case, back to the requester) but also specifies the level of evidence required—in this case, that evidence is provided for the processes in the service for which at least some level of trust is specified. The contract then specifies the service in sufficient detail that the trusted computing platform can carry it out.

Once the contract is received and accepted, the service management process 803 begins to operate. The first job is for the service management process 803 to allocate processes in the contract to different computational engines within the trusted computing platform (conceivably, processes could even be subcontracted outside the trusted computing platform, though not generally where evidence of performance is required). In the present case, Process 1 does not have any trust requirements and can be allocated to the normal computing environment of the trusted computing platform (designated here by operating system 806), whereas Process 2 requires the highest available level of trust, and is thus allocated to trusted compartment 805 (an alternative would be for Process 2 to require specifically the use of a trusted compartment). Process 3 has a "Required" level of trust—indicating here that the trusted performance is required, but at a level below "Highest"—it could be for the service management process 803 to determine how this level of trust was to be met on that specific computing platform. In this example, consider that Process 3 is determined suitable to be run in a compartment (here, Compartment A) 807. Process is a "Standard" process (a well-known process of a type already known to the trusted computing platform or determinable from sources known to the trusted computing platform) which, here, is to be run in a compartment—it is allocated to Compartment B (808).

When processes are allocated to the different computing engines, it is also necessary to determine the logging of evidence associated with each process. This may be sufficiently well specified in the contract that no further interpretation is needed: for example, Process 1 requires no logging at all (though it is entirely possible for processes carried out in the normal computing environment of the trusted computing platform to be logged, as will be described further below), and Process 3 requires that all inputs and outputs to the process be logged (but not details of the operation itself). For Process 2, the contract stipulates that logging be 100%. This will involve logging: all inputs to the process, together with the sequence in which the inputs are provided to the process; all outputs from the process, together with the sequence in which outputs are provided by the process; and all program instructions executed by the process, together with the sequence in which they are executed. For Process 4, the level of trust is set at a "Standard Profile"—such a profile could be agreed throughout a relevant community for a standard process such as Process 4, or could be otherwise well-known to both requestor 801 and the trusted computing platform.

Alternatives are available to simple logging of input, output and execution data (or a subset of this data). Input, output and execution data could all be sampled by the logging process. Sampling intervals could be explicitly stated in the contract, or may be determined by a function provided or referred to in the contract, preferably with a secret initial value (perhaps provided under the contract). If such a function is used, it is desirable to use a function with a large amount of entropy, such as a cryptographic hash or cipher (most advantageously a stream cipher, as this produces output data at the highest rate). After initialization, the function produces a data stream. The data stream can then be inspected, and when a particular pattern or patterns appear in that output, the data is sampled and a digest computed (an exemplary process for logging a sequence of values efficiently is to: (1) concatenate the existing value of the sequence (function) with the new value to be appended to the sequence; (2) pass the data through a hash algorithm, such as SHA-1 (described in National Institute of Standards and Technology (NIST), *Announcement of Weakness in the Secure Hash Standard,* 1994); and (3) set the digest produced by the hash algorithm as the new value of the sequence). The smaller the length of the pattern, the more frequent the average sample rate. Evidence of a process can thus be gathered at a lower average rate than the baud rate of the data. The use of a function with high output entropy (such as a hash or cipher) with pattern matching on its output provides an irregular sampling rate that makes it difficult to predict when data will not be sampled. The use of a secret initialization value provides a convenient way of expressing an irregular sampling rate as a single value. For logging program instructions (where the speed of the process may be severely limited by the sampling and logging process) it may be desirable to use an ensemble of hash engines operating in a predetermined manner or sequence in order to handle a higher baud rate of program instructions.

In addition to determining the logging for individual processes, the service management process 478 may also need to pass custom data to the separate computational engines. Some of this data may be specifically encrypted in addition to the encryption under which the contract was provided, or the contract may require such data to be encrypted before it passes outside the trusted space 401 (for example, it may be intended for use by a process executing in a compartment, but the compartment itself is adapted to decrypt the data when it is passed to the compartment by the service management process 478). Processes may not need to be passed all the input data they will consume—some data will be standard data, or data known to be available on or accessible to the trusted computing platform. Use of data by processes will be discussed further below.

Once the nature of the evidence to be gathered has been established, it is desirable to establish how that data will be assembled when it has been collected. This may be achieved, for example, by providing the event logging process 472 with an identification of all the processes for which evidence will be collected together with an indication of the nature of the evidence to be collected for each such process.

The processes, and the evidence process associated with each process, are then sent to the relevant computational engines (so Process 1 is sent for execution to the general computational environment, Process 2 is sent for execution by trusted compartment 805, Process 3 is sent for execution by one compartment 807, whereas Process 4 is sent for execution by another compartment 808). The manner of execution of service processes and associated evidence processes will differ depending on whether processes are carried out in the normal computing environment 806 or in a compartment 807,808 or trusted compartment. They will vary still more if the service process (and so the evidence process) are swapped so that they are conducted partly in one environment and partly in another.

For processes carried out in the normal computing environment, there may be no evidentiary requirements (as is the case for Process 1 in FIG. 8). This is not necessarily the case—logging may be carried out, for example, by an agent running in the normal computing environment and interacting with the event logger 804 in the trusted space 401. Such an arrangement is described in the applicant's copending International Patent Application No. PCT/GB00/02004, entitled "Data Event Logging in Computer Platform" and filed on May 25, 2000. Generally no particular requirements on use of input data would be made for processes carried out in the normal computing environment, but restrictions on use of input data (as is discussed below for the case of compartments) may be used where appropriate.

For processes running in a compartment (whether in the user space or the trusted space) the stages of performance of a process (here described as service process for clarity) will now be described. For this example, performance of a service process in compartment 410 in FIG. 6 will be considered. The compartment contains a JVM as a virtual computing engine 411, a communications process 412 to allow exchange of data with (in particular) the service management process 478 and the event logging process 472, a monitoring process 413 for logging details of the process carried out on the JVM 411 and returning details to the event logger 472, together with a memory 414 for holding data needed by the JVM 411. The service process is provided to the compartment through communications process 412 and necessary data placed in the memory 414. The service process can then be loaded on JVM 411 and the monitoring process 413 initiated according to the monitoring requirements provided with the service process.

Optionally, a compartment may be equipped for secure communications with the trusted component 24 (it may, for example, be provided with a cryptographic identity and appropriate cryptographic functions). If this is done, the process and any data sent with it by the service management process may be encrypted for decryption by the compartment.

The constrained nature of the compartment environment (in particular, features such as the class loader) prevent the loading of code other than that which is intended. This allows for secure loading of the service process onto the JVM 411. In a preferred modification, this approach can be extended to input data used by a service process. Preferably, data for use by service processes includes use permission information for that data (a default could be provided if there is no use permission attached—logically, this would be to allow unlimited use). Service processes, particularly those executing in a constrained environment such as a compartment, can then be adapted such that input data is only used if the service process qualifies under the relevant permissions. This may be achieved by typing input data to a service process (and logically also output data from the service) with labels, and also typing the operations performed by the service process upon data. A type label may indicate function ("use only in processes connected in searching for insurance policies and in processes connected with obtaining approval for a credit card application") or operational conditions ("use only in processes that execute before a certain time") or both. If the intended use of the data by a process is incompatible with the type label of that data, the data is not used by the process and an exception may be raised. Typing of input and output data, and of service process operations, in this way prevents data misuse.

When the compartment 410 returns input data to the process (this may be from memory 414 if the relevant data was provided by the service management process, from the main memory of the computing platform (or elsewhere) if it is well-known data or if a reference to data location has been passed to the service process, or may even be specifically requested from the trusted component 24) the monitoring process 413 generates, if required, a secure log of the input data (and, advantageously, any associated type tag). As indicated above, an effective way to do this is to store all this logged data in a linked-list (which will eventually be signed by the trusted component 24), preferably by appending the data to a temporary sequence inside the compartment. This data can be added to a log describing the process. The monitoring process adopted can be essentially similar to the process used by the trusted component 24 to monitor the integrity of the trusted computing platform.

Input data may be obtained from third parties, or may be present locally but have an identified "owner". In these cases, it may be desirable for the owner to be informed when the owner's data is used as input data in a service process—it may also be desirable for the process to contact the owner to obtain active consent to its use. In addition to input data, it is possible that a service process may call other processes or routines which could themselves have owners. Again, in embodiments of the invention the compartment could inform these owners of the use of their processes or routines.

Similarly, the monitoring process 413 can monitor execution of the service process, most logically by noting the value of the instructions and the order in which they execute. Use of sampling, as described above, may be particularly useful in this aspect of the monitoring process to reduce the volume of evidence produced or the computational burden in obtaining it. A preferred solution is to use a hash algorithm or stream cipher initialised with a nonce to produce an irregular sample rate. As for input data, the resulting data (including the nonce, the log and the sequence value in the irregular sampling case) would eventually be provided for signature by the trusted component 24.

When the service process produces output data, it writes it to (generally) memory 414 and preferably includes with the output data a type of usage permitted on the data. A secure log of the output data may be generated in essentially the same way as for input data.

At the end of the execution of the service process on the compartment, there are two types of output. One is, as normal, the output results of the service process. In addition, there is (if requested by the service management process) a log produced by the monitoring process 413 which includes one or more of input data, output data and process execution data, in any form from a complete record of data and instructions to a calculated value of a sampling process, with different monitoring processes often used for different types of information. This log will conform to the evidence request passed to the compartment by the service management process.

Another possibility is available other than execution of a service process in the normal computing environment of the trusted computing platform or execution in a compartment or trusted compartment. This is for a service process to be swapped between one execution environment and another: for example, swapping of a process from the normal computing environment into a compartment or protected compartment, or swapping of a process between a compartment and a protected compartment. This swapping could be specified in the contract, or it could be determined by the service management process in order to meet the requirements of the contract while optimising system resources. Another possibility would be for a process swap to be initiated by the process itself: for example, if input data was received which could not, by its type, be executed upon in the normal computing environment but only in a more protected environment such as a compartment. Swapping of processes in this manner is essentially similar to the swapping of processes between physically distinct processors, using well understood techniques such as remote procedure calls, and to the swapping of processes within a multitasking computer. Although in this case the "first computer" may lie physically within the "second computer" (or vice versa), this does not cause any fundamental difference in the techniques that need to be applied. The skilled person will thus well understand how swapping of processes can be achieved, and this will not be described further.

For a service process which is independent of input data, execution of the service process may be predictable. If the process is well understood (Process 4 in the present example), it is then possible for predicted values of the service process evidence to be created independent of execution of the process (for a well known process, predicted values may for example be stored in the trusted component 24). If a compartment is running such a service process and collecting evidence of execution, this evidence can be compared with the predicted evidence—if there is not a satisfactory match, execution of the service process could be terminated and an exception generated.

Figure 9:
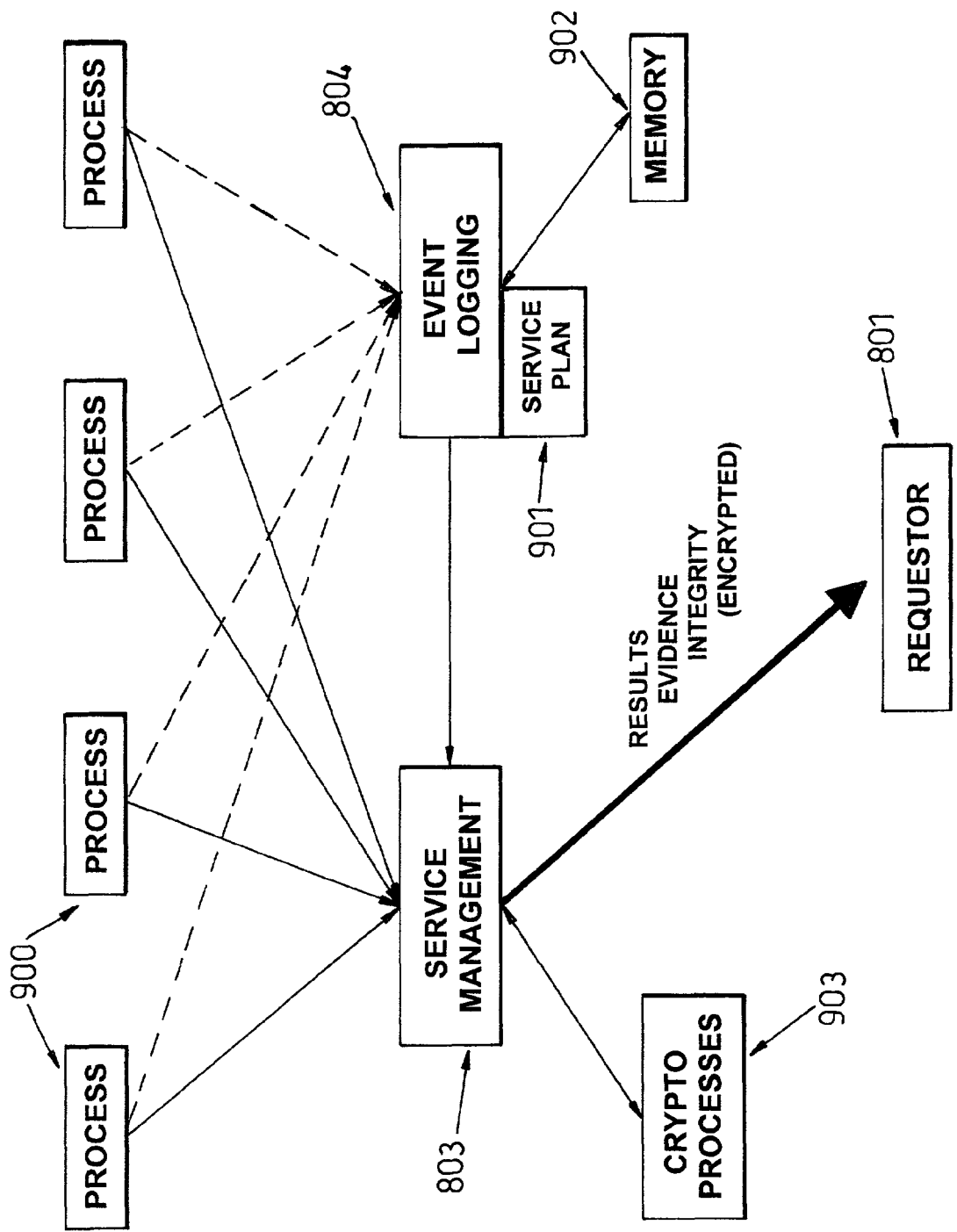
FIG. 9 is a diagram illustrating the gathering of evidence in performance of service elements and the provision of evidence to the requester.

After each of the separate service processes 900 have been executed the service process results and evidence are returned to the service management process 803 and the event logger 804 respectively (as is shown most clearly in FIG. 9)—if there has been an exception the service management process 803 will also be notified. If one service process is dependent upon the results of another service process, data may then be provided by the service management process or new service processes scheduled or allocated. The service management process 803 assembles the results of the separate processes as required, and will contain the service results when all the service processes have executed (assuming that there has been no exception).

The event logging process 804 may have itself been collecting evidence for service processes run outside compartments, for example by using an agent in the user space (as described above). In addition, it will receive process evidence from service processes running within compartments according to the requirements placed on those service processes. This process evidence may be checked against what is expected. The event logging process 804 contains information received from the service management process 803 setting out the allocation of service processes to computing engines, and the evidentiary requirements for each process (in service plan 901). The event logging process may be able to check the evidence produced by a service process to determine whether it is consistent (for example, in format) with that expected from the evidentiary requirements set out in service plan 901. For processes that execute in a manner independent of input data, further checking is possible predicted standard evidence results for such processes could be stored within a memory 902 in the trusted space 401. In either case, an appropriate exception could be generated if a mismatch was found.

If the event logging process 804 finds no exceptions, it can then combine the process evidence in accordance with the service plan 901 (the manner of combination of evidence may be specified by the contract). The service evidence can then be returned to the service management process 803.

The service management process 803 now has the service results and the service evidence. It can also obtain in accordance with normal operation of the trusted component 24 integrity data for the trusted computing platform at the time of service execution. The service management process 803 can now send the service results wherever they are required—most typically, back to the requestor 801. If desired, these can be signed with the private key of the trusted component 24 using the cryptographic processes 903 of the trusted component 24. The service evidence will generally be returned to the requestor 801 after signature by the trusted component 24, often together with the (signed) integrity metric for the trusted computing platform at the time of execution of the service.

The skilled person will appreciate that many changes may be made to the architecture set out here, and the processes used, without departing from the scope of the invention. The embodiment shown in FIGS. 6 to 9 is adapted to be particularly secure, as key components such as the service management process and the event logger are located in the trusted space 401. Embodiments of the invention can be provided in which some or all of these processes are removed to the user space 400. The advantage of performing such processes in the user space 400 is that a simpler trusted component 24, and hence a cheaper architecture, can be used. The user space 400 is to a significant extent trustworthy, as the trusted computing platform is monitored by trusted component 24. The event logging process in particular can be displaced to the user space 400 without great effect to the trusted nature of the performance of the service. The service management process may be more difficult to displace to the user space, but this could perhaps itself execute within a compartment adapted for secure communication with the trusted space 401.

Use of this approach is not limited to the request by one party for service performance by another party. The trusted computing platform could be a mutually trusted party which could be used when a client did not want to release its data to a service, a service provider did not want to release its program to a client, or if services are required by a client from disparate suppliers. The mutually trusted party is trusted by all the other parties involved to guarantee isolation of data and services except as necessary (or otherwise specified) and to guarantee complete erasure of data and services when the cotnract has been fulfilled.

Where the trusted computing platform has guaranteed to erase data and services, it may be desirable for the trusted computing platform to retain itself (possibly in secure storage) sufficient information to identify the service together with the evidence that the service was satisfactorily performed—otherwise the trusted computing platform or its owner will be disadvantaged in the event of any subsequent dispute.

The invention claimed is:

1. A method of performing a service for a requestor on a computing platform, comprising:
    the requestor providing a specification of the service to be performed to the computing platform, wherein the specification of the service establishes specified levels of trust for at least one of the processes in the service;
    the computing platform executing the service according to the specification and logging performance of at least one of the processes for which a level of trust was specified; and
    the computing platform providing the requester with a log of the performance of the processes performed according to the specified levels of trust.

2. A method as claimed in claim 1, wherein a level of trust is specified for at least two processes in the specification, and no performance logging takes place for at least one of the processes for which a level of trust is specified in the specification.

3. A method as claimed in claim 1, wherein the computing platform contains a physically and logically protected computing environment.

4. A method as claimed in claim 3, wherein said physically and logically protected computing environment contains a monitoring process for measuring integrity of the computing platform.

5. A method as claimed in claim 4, wherein the monitoring process provides to the requestor an integrity metric of the computing platform at the time the service was performed.

6. A method as claimed in claim 3, wherein a service management process allocates the execution of processes and logging of performance to discrete computing environments in or associated with the computing platform.

7. A method as claimed in claim 6, wherein the service management process is located within the protected computing environment.

8. A method as claimed in claim 6, wherein one or more of the discrete computing environments is a compartment containing a computing engine protected against influence from outside the compartment by operational or environmental constraints.

9. A method as claimed in claim 8, wherein the computing engine is a Java virtual machine.

10. A method as claimed in claim 8, wherein one or more compartments is located within the protected computing environment.

11. A method as claimed in claim 8, wherein the computing engine is constrained not to operate on input data if it is not permitted to do so.

12. A method as claimed in claim 11, wherein input data is provided with a data type, and a process is provided with operation types, and operation is prevented if operation types and data types are not consistent.

13. A method as claimed in claim 11, wherein input data may have an owner, and the process may be required to inform the owner of use of the input data.

14. A method as claimed in claim 11, wherein input data may have an owner, and if so, the process may be required to obtain consent from the owner to use the input data.

15. A method as claimed in claim 6, wherein a process may be swapped between one discrete environment and another discrete environment.

16. A method as claimed in claim 1, wherein performance logging includes logging of input data to a process.

17. A method as claimed in claim 1, wherein performance logging includes logging of output data from a process.

18. A method as claimed in claim 1, wherein performance logging includes logging of program instructions executed in performance of a process.

19. A method as claimed in claim 1, wherein data logged is sampled according to a sampling process to provide the performance log.

20. A method as claimed in claim 19, wherein the sampling process is performed according to a function to provide irregular sampling.

21. A method as claimed in claim 1, where a digest of data logged is obtained as part of the performance logging data.

22. A method as claimed in claim 1, wherein the performance logging data is encrypted before it is sent to the requestor.

23. A method as claimed in claim 1, wherein the specification establishes performance logging parameters for at least one of the processes in the service.

24. A computing platform, comprising:
    a physically and logically protected computing environment, adapted to provide trustworthy data to appropriate users of the computing platform; and
    one or more compartments, arranged to operate in a sufficiently constrained manner that processes executed in a compartment are performed reliably;
    wherein specified processes may be executed for a user in the one or more compartments and the results of the specified processes returned to the user in trustworthy data from the protected computing environment; and
    wherein the computing platform comprises a service management process adapted to receive a service description which includes levels of trust assigned to processes within the service, and to allocate at least one of the processes to the compartments.

25. A computing platform as claimed in claim 24, wherein one or more of said compartments are located outside the protected computing environment.

26. A computing platform as claimed in claim 24, wherein one or more of said compartments are located inside the protected computing environment.

27. A computing platform as claimed in claim 24, wherein each compartment contains a virtual computing engine.

28. A computing platform as claimed in claim 27, wherein the virtual computing engine is a Java virtual machine.

29. A computing platform as claimed in claim 24, wherein the protected computing environment contains a monitoring process adapted to measure the integrity of the computing platform.

30. A computing platform as claimed in claim 24, wherein service management process is located within the protected computing environment.

* * * * *